United States Patent
O'Regan et al.

(10) Patent No.: US 12,391,589 B2
(45) Date of Patent: Aug. 19, 2025

(54) TREATMENT PROCESS FOR WASTE STREAMS

(71) Applicant: SCFI LIMITED, Cork (IE)

(72) Inventors: John O'Regan, Waterfall (IE); David McGarry, Cork (IE)

(73) Assignee: SCFI LIMITED, Cork (IE)

( * ) Notice: Subject to any disclaimer, the term of this patent is extended or adjusted under 35 U.S.C. 154(b) by 266 days.

(21) Appl. No.: 17/908,940

(22) PCT Filed: Feb. 26, 2021

(86) PCT No.: PCT/EP2021/054918
§ 371 (c)(1),
(2) Date: Sep. 2, 2022

(87) PCT Pub. No.: WO2021/175732
PCT Pub. Date: Sep. 10, 2021

(65) Prior Publication Data
US 2024/0034655 A1    Feb. 1, 2024

(30) Foreign Application Priority Data
Mar. 6, 2020  (EP) .................................... 20161667

(51) Int. Cl.
*C02F 1/02* (2023.01)
*B01J 3/00* (2006.01)
(Continued)

(52) U.S. Cl.
CPC ............... *C02F 1/727* (2013.01); *B01J 3/008* (2013.01); *B01J 3/02* (2013.01); *B01J 3/042* (2013.01); *C02F 1/02* (2013.01); *C02F 1/74* (2013.01); *C02F 11/08* (2013.01); *C02F 2103/365* (2013.01); *C02F 2209/02* (2013.01); *C02F 2209/03* (2013.01); *C02F 2301/066* (2013.01); *C02F 2303/08* (2013.01); *C02F 2303/10* (2013.01); *Y02W 10/30* (2015.05)

(58) Field of Classification Search
CPC .... C02F 1/727; C02F 1/02; C02F 1/74; C02F 11/08; C02F 2103/365; C02F 2209/02;
(Continued)

(56) References Cited

U.S. PATENT DOCUMENTS 5,244,576 A    9/1993 DeRoeck et al.
5,770,174 A    6/1998 Eller et al.
(Continued)

FOREIGN PATENT DOCUMENTS

CN    101257975 A  *  9/2008    .............. B01J 31/40
KR    920002070 B1 *  3/1992

OTHER PUBLICATIONS

Machine-generated English translation of CN 101257975, generated on Jan. 24, 2025.*
(Continued)

*Primary Examiner* — Fred Prince
(74) *Attorney, Agent, or Firm* — Studebaker Brackett PLLC

(57) ABSTRACT

A spent caustic treatment process addresses the shortcomings with traditional Wet Air Oxidation Systems. The process can treat either refinery or sulphidic spent caustic streams with CODs of up to 50,000 mg/L. The process uses >90% oxygen as an oxidising agent. A horizontal, tubular reactor is operated at pressures between 100 and 170 Bar (ideally 145-165 Bar). The reactor has an operating temperature of between 120° C. and 320° C., ideally 280° C. to 300° C. A closed heat transfer medium circulation loop is utilised for heat recovery from the reactor effluent stream to the spent caustic feed stream. The invention allows for a COD reduction of 7 5 to 99.9%.

18 Claims, 1 Drawing Sheet

(51) Int. Cl.
  *B01J 3/02* (2006.01)
  *B01J 3/04* (2006.01)
  *C02F 1/72* (2023.01)
  *C02F 1/74* (2023.01)
  *C02F 11/08* (2006.01)
  *C02F 103/36* (2006.01)

(58) Field of Classification Search
  CPC ............ C02F 2209/03; C02F 2301/066; C02F 2303/08; C02F 2303/10; B01J 3/008; B01J 3/02; B01J 3/042; Y02W 10/30
  USPC ................ 210/758, 759, 760, 761, 762, 763
  See application file for complete search history.

(56) References Cited

U.S. PATENT DOCUMENTS

| | | | |
|---|---|---|---|
| 6,576,144 | B1 | 6/2003 | Vineyard |
| 7,005,076 | B2 | 2/2006 | Chowdhury et al. |
| 2010/0126937 | A1* | 5/2010 | Felch ...................... C02F 1/725 |
| | | | 210/709 |
| 2012/0085711 | A1* | 4/2012 | Zander .................... C02F 1/727 |
| | | | 210/761 |
| 2014/0251924 | A1 | 9/2014 | Kumfer et al. |
| 2016/0045841 | A1* | 2/2016 | Kaplan ................... C01B 32/05 |
| | | | 429/49 |
| 2020/0216337 | A1* | 7/2020 | Kumfer ..................... C02F 1/74 |

OTHER PUBLICATIONS

Machine-generated English translation of KR 920002070, generated on Jan. 24, 2025.*

An Office Action and Search Report issued by the United Arab Emirates Ministry of Economy on Oct. 10, 2024, which corresponds to UAE Application No. P6001762/2022 and is related to U.S. Appl. No. 17/908,940.

International Search Report issued in PCT/EP2021/054918; mailed May 20, 2021.

* cited by examiner

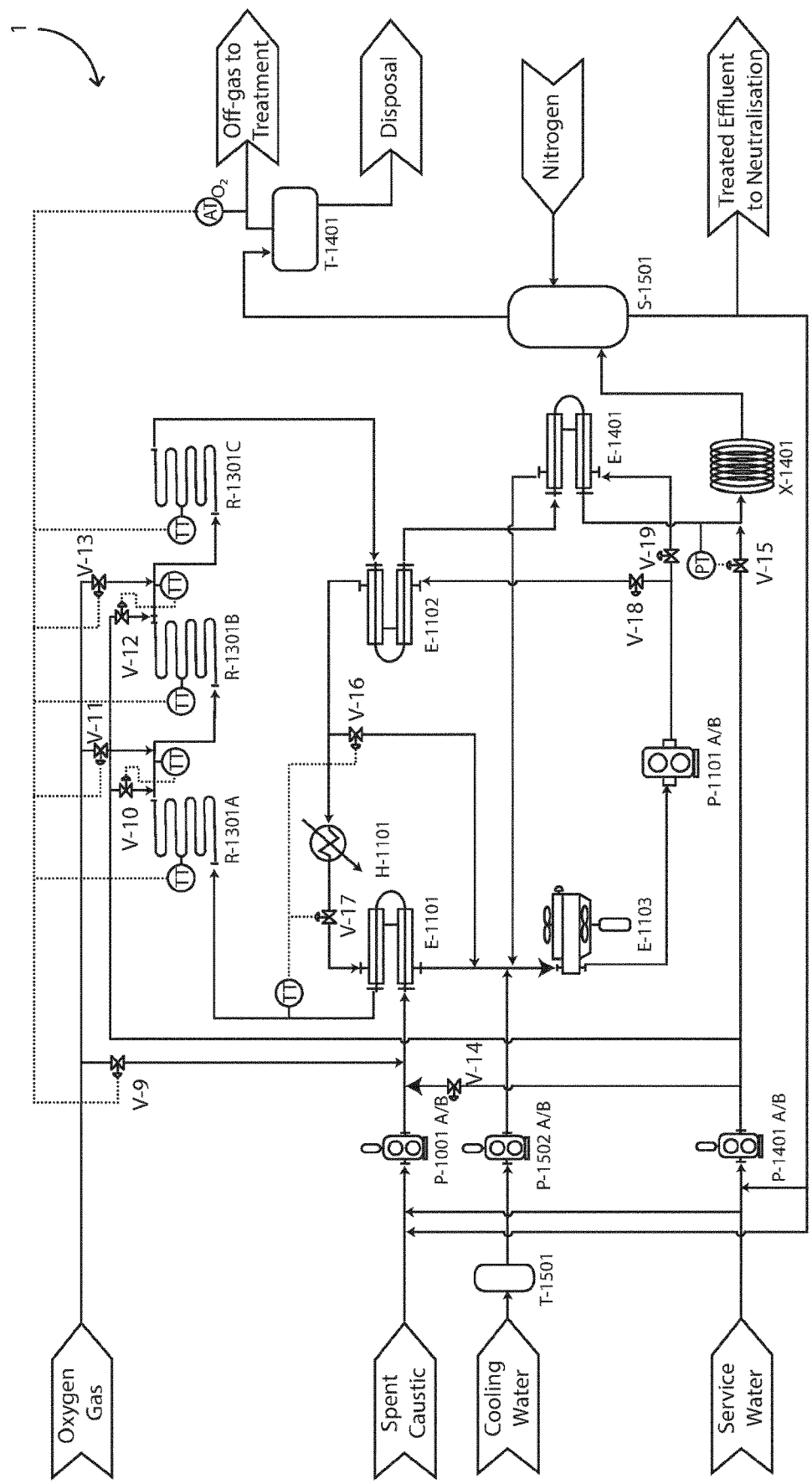

TREATMENT PROCESS FOR WASTE STREAMS

The invention relates to treatment of waste streams.

Some manufacturing processes give rise to hazardous waste streams such as caustic waste streams or other waste streams with oxidizable chemical oxygen demand (COD).

The invention is directed towards effectively treating this product in an environmentally friendly and cost-effective manner.

SUMMARY OF THE INVENTION

The invention provides a treatment process for treatment of a waste stream with oxidizable COD, as set out in the claims.

We describe a treatment process for treatment of a waste stream with oxidizable COD, the method comprising the steps of feeding the waste stream through a tubular reactor at a temperature, pressure, and retention time to cause oxidation of hazardous components of the waste stream.

In one example, the temperature is in the near critical range of 120° C. and 360° C. In one example, the pressure is in the range of 90 Bar to 170 Bar. In one example, the retention time is in the range of 8 mins to 30 mins.

Preferably, the process comprises:
(a) feeding the stream through a heat exchanger and tubular reactor at sufficient velocity and salt dilution to provide a treated liquid,
(b) a plurality of inline oxygen and quench water injection points to control the exothermic oxidation reactions,
(c) heat recovery from the reactor effluent stream by using either pressurized hot water or another thermal fluid circuit, and
(d) separating the treated liquid to provide a gas safe for discharge to the atmosphere and a treated liquid effluent stream, Preferably, heating is performed by one or more heat exchangers having a tube-in-tube configuration, the outer tube carrying pressurised hot water or another thermal fluid.

In various examples, the waste stream includes spent caustic. Preferably, the spent caustic (SC) is either a refinery or a sulphidic spent caustic stream containing oxidizable COD.

Preferably, an oxidising agent is applied to the reactor.

In various examples, the tubular reactor is operated at a pressure between 90 Bar and 170 Bar, preferably 145 Bar to 165 Bar; and the reactor has an operating temperature of between 120° C. and 320° C., preferably 250° C. to 300° C. The operating temperature and pressure are selected based on an optimisation of the complex interaction between oxygen solubility, reaction kinetics, horizontal pipe flow regime and oxygen mass transfer from the gaseous to the liquid phase. These operating conditions ensures maximum oxygen solubility, rapid liquid phase oxidation reactions, fully developed plug flow and sufficient mass transfer of oxygen from the gaseous to the liquid phase.

In various examples, a closed circulation system of either, high-pressure water, or another heat transfer medium, performs heat recovery from the reactor effluent stream to the spent caustic feed stream.

In various examples, prior to adding heat to the stream, excess oxygen is injected. In various examples, the oxygen is injected upstream of an economiser, whereby sulphides are converted to sulphates to protect downstream equipment and pipework against sulphidic attack.

In various examples, after the oxygen injection, the feed is preheated in an economiser using an indirect heat transfer loop, which uses either high-pressure water or another heat transfer medium.

In various examples, heat for preheating the economiser is provided by cooling the reactor effluent stream. In various examples, an air cooler cools the heat transfer medium from the economiser to below 60° C.

In various examples, oxidant is injected at a plurality of injection points along the length of the reactor allowing for the addition of quench water and oxygen, and in which the oxidation reactions are exothermic and the heat of reaction heats the process stream, and a pump pumps high pressure quench water to the quench water injection points along the length of the reactor, quenching the reactor temperature before more oxygen is injected, driving the reaction to completion.

In various examples, hot effluent from the reactor is sent to a heat exchanger for heat recovery to preheat the feed to the reactor.

In various examples, the stream is cooled to between 60° C. and 80° C. in an effluent cooler, in which the heat transfer fluid is routed to the inlet of the air cooler where it is cooled before being reused in the closed, heat transfer medium circulation loop, either for heat recovery form the reactor effluent stream or cooling of the reactor effluent stream.

In various examples, a pressure let-down step is performed whereby where the effluent pressure is reduced to a lower level such as approximately atmospheric pressure, and preferably the pressure drop is achieved by the introduction of choke water from a pump and subsequently passing the effluent stream through continuous capillary coils with small internal dimensions.

In various examples, the effluent stream, at now reduced pressure, is sent to a gas-liquid separator from where the gas-free liquid effluent is either pumped or flows under gravity to neutralisation or disposal.

In some cases, a portion of the treated effluent can be recycled and reused as a quench stream to the reactor and/or choke fluid to the pressure let-down step of the process. This eliminates the requirement for service water during steady state operation. In other examples, an additional portion of treated effluent is recycled and mixed with the incoming spent caustic feed stream. Feed dilution using treated effluent allows for higher flexibility in terms of maximum feed COD that can be treated. This ensures fine control on the quality of the feed fed to the treatment process, beneficial for steady state processing.

In various examples, nitrogen is introduced to a gas/liquid separator to ensure a constant flow of gas to the discharge.

In various examples, a spent caustic (SC) treatment process addresses the shortcomings with traditional Wet Air Oxidation (WAO) Systems. The process can treat either refinery or sulphidic spent caustic streams with CODs of up to 50,000 mg/L. Spent caustic streams with CODs higher than 50,000 mg/L can be processed by utilising the treated effluent recycle to dilute the feed stream down to 50,000 mg/L. The process uses >90% oxygen as an oxidising agent. A horizontal, tubular reactor is operated at pressures between 100 and 170 Bar (ideally 145165 Bar). The reactor has an operating temperature of between 120° C. and 360° C., ideally 280° C. to 300° C. A closed system, heat transfer medium circulation loop is utilised for heat recovery from the reactor effluent stream to the spent caustic feed stream. The invention allows for a COD reduction of 75 to 99.9%.

Additional Statements

We describe a treatment process for treatment of a waste stream with oxidizable COD, the method comprising the steps of feeding the waste stream through a tubular reactor at a temperature, pressure, and retention time to cause destruction of hazardous components of the waste stream.

In one example, the temperature is in the near critical range of 220° C. and 360° C. In one example, the pressure is in the range of 90 Bar to 170 Bar. In one example, the retention time is in the range of 8 mins to 30 mins.

Preferably, the process comprises:
(a) feeding the stream through a tubular reactor in a manner to avoid precipitation to provide a treated liquid,
(b) a plurality of inline oxygen and quench water injection points to control the exothermic oxidation reactions,
(c) heat recovery from the reactor effluent stream by using a pressurized hot water circuit, and
(d) separating the treated liquid to provide a gas safe for discharge to the atmosphere and a treated liquid effluent stream, Preferably, heating is performed by one or more heat exchangers having a tube-in-tube configuration, the outer tube carrying pressurised hot water.

In various examples, the waste stream includes spent caustic. Preferably, the spent caustic (SC) is either a refinery or a sulphudic spent caustic stream containing oxidizable COD.

Preferably, an oxidising agent is applied to the reactor.

In various examples, the tubular reactor is operated at a pressure between 100 Bar and 170 Bar, preferably 145 Bar to 165 Bar; and the reactor has an operating temperature of between 120° C. and 320° C., preferably 280° C. to 300° C.

In various examples, a closed system, high pressure water circulation loop performs heat recovery from the reactor effluent stream to the spent caustic feed stream.

In various examples, prior to adding heat to the stream, excess oxygen is injected. In various examples, the oxygen is injected upstream of an economiser, whereby sulphides are converted to sulphates to protect downstream equipment and pipework against sulphidic attack.

In various examples, after the oxygen injection, the feed is preheated in an economiser using an indirect heat transfer loop, which uses water as the heat transfer medium.

In various examples, heat for preheating the economiser is provided by cooling the reactor effluent stream. In various examples, an air cooler in the high temperature fluid loop cools the water from the economiser to below 60° C.

In various examples, oxidant is injected at a plurality of injection points along the length of the reactor allow for the addition of quench water and oxygen, and in which the oxidation reactions are exothermic and the heat of reaction heats the process stream, and a pump pumps high pressure quench water to the quench water injection points along the length of the reactor, quenching the reactor temperature before more oxygen is injected, driving the reaction to completion.

In various examples, hot effluent from the reactor is sent to a heat exchanger for heat recovery to preheat the feed to the reactor.

In various examples, the stream is cooled to between 60° C. and 80° C. in an effluent cooler, in which cooling water is routed to the inlet of the air cooler where it is cooled before being reused in the closed recycle loop, either for heat recovery form the reactor effluent stream or cooling of the reactor effluent stream.

In various examples, a pressure let-down step is performed whereby where the effluent pressure is reduced to a lower level such as approximately atmospheric pressure, and preferably the pressure drop is achieved by the introduction of choke water from a pump and subsequently passing the effluent stream through continuous capillary coils with small internal dimensions.

In various examples, the effluent stream, at now reduced pressure, is sent to a gas-liquid separator from where the gas-free liquid effluent is either pumped or flows under gravity to neutralisation or disposal.

In various examples, nitrogen is introduced to a gas/liquid separator to ensure a constant flow of gas to the discharge.

In various examples, a spent caustic (SC) treatment process addresses the shortcomings with traditional Wet Air Oxidation (WAO) Systems. The process can treat either refinery or sulphudic spent caustic streams with CODs of up to 50,000 mg/L. The process uses >95% oxygen as an oxidising agent. A horizontal, tubular reactor is operated at pressures between 100 and 170 Bar (ideally 145-165 Bar). The reactor has an operating temperature of between 120° C. and 320° C., ideally 280° C. to 300° C. A closed system, high pressure water circulation loop is utilised for heat recovery from the reactor effluent stream to the spent caustic feed stream. The invention allows for a COD reduction of 75 to 99.9%.

DETAILED DESCRIPTION OF THE INVENTION

The invention will be more clearly understood from the following description of some embodiments thereof, given by way of example only with reference to the accompanying drawings in which:

FIG. 1 is a flow diagram illustrating treatment of a waste stream with an oxidizable COD, like spent caustic.

Spent Caustic Treatment

Spent caustic is a hazardous waste stream originating from refineries utilising sodium hydroxide to achieve removal of acidic components from the main process streams. These acidic components include hydrogen sulfide ($H_2S$), methyl mercaptan ($CH_4S$), crecylic acids ($C_7H_8O$) and naphthenic acid ($Na-C_{12}H_{22}O_2$). Ethylene production also utilizes aqueous sodium hydroxide solutions for scrubbing $H_2S$ and carbon dioxide ($CO_2$) from cracked gas streams. Spent caustic streams typically have a chemical oxygen demand (COD) of between 10,000 to 100,000 mg/L. If not treated before disposal, spent caustic interferes with the traditional biological wastewater treatment systems in the sense that it results in pH swings, inhibition of nitrification, poor biological conversion and solid settling, emission of toxic hydrogen sulphide and contributes to foaming. The handling of the harmful, odorous, corrosive and toxic spent caustic waste stream has been proven to be challenging.

Spent caustic waste streams typically consists of the following components: Cresylic Acid, Naphthenic acid, Phenols, Mercaptan, Sodium sulphide, Sodium hydrosulphide, and/or fats, oils and grease.

The spent caustic waste streams are classified into two groups. The groups relate to the origin of the waste stream and is referred to as refinery spent caustic and ethylene spent caustic respectively. The two spent caustic waste streams differ in terms of composition, and the invention relates to the development of a process with the flexibility of treating either one of the two waste streams.

The refinery spent caustic contains organic compounds such as naphthenic acid and/or cresylic acid while the ethylene spent caustic contains mainly sodium sulphide. The following chemical reactions are considered in relation to the specific spent caustic in question.

Refinery Spent Caustic

Cresylic Acid: $2\ C_7H_8O + 17\ O_2 + 28\ NaOH \rightarrow 14\ Na_2CO_3 + 22\ H_2O$ Naphthenic Acid: $Na\text{—}C_{12}H_{22}O_2 + 16.75\ O_2 + 23\ NaOH \rightarrow 12\ Na_2CO_3 + 22.5\ H_2O$ Fats, oils & grease: $C_9H_2O + 14\ O_2 + 18\ NaOH \rightarrow 9\ Na_2CO_3 + 19\ H_2O$ Ethylene Spent Caustic Sodium Sulphide: $Na_2S + 2\ O_2 \rightarrow Na_2SO_4$ Fats, oils & grease: $C_9H_2O + 14\ O_2 + 18\ NaOH \rightarrow 9\ Na_2CO_3 + 19\ H_2O$ The by-products of the oxidation process are carbon dioxide, sodium sulphate and water. The corrosive nature of spent caustic streams further complicates the treatment process. Carbon dioxide ($CO_2$), a by-product from the reactions, reacts with the sodium hydroxide (NaOH) to produce sodium carbonate ($Na_2CO_3$). Once all the NaOH has been depleted, any remaining $CO_2$ results in the formation of carbonic acid and the resultant drop in pH of the solution. This acidity results in conditions ideal for corrosion. Thus, there is a specific minimum caustic feed concentration, this can be adjusted for before processing commences. With sulphidic solutions, the stream becomes highly corrosive at temperatures greater than 100° C.

The stated conditions require the development of a process allowing for effective COD destruction while at the same time being robust against the corrosive nature of the products.

We describe a spent caustic (SC) treatment process developed to address the shortcomings with traditional Wet Air Oxidation (WAO) Systems. The process can treat either refinery or sulphidic spent caustic streams with CODs of up to 50,000 mg/L without the requirement for feed dilution. The process can treat spent caustic streams with CODs in excess of 50,000 mg/L by recycling treated effluent to dilute the feed stream down to 50,000 mg/L. The process uses >90% oxygen as an oxidising agent. A horizontal, tubular reactor is operated at pressures between 90 and 170 Bar, preferably 145 Bar to 165 Bar for many waste streams. The reactor has, for many waste streams, an operating temperature of between 120° C. and 360° C., preferably 120° C. to 320° C., more preferably, 250° C. to 300° C. A closed system, heat transfer medium circulation loop is utilised for heat recovery from the reactor effluent stream to the spent caustic feed stream. The invention allows for a COD reduction of 75 to 99.9%.

A process of one example for treating spent caustic is now described with reference to FIG. 1. It is implemented by an apparatus 1, of which the main equipment components are:

| | |
|---|---|
| P-1001 | High pressure feed pump |
| E-1101 | Low temperature economizer |
| R-1301 | Tubular oxidation reactor |
| E-1102 | High temperature economizer |
| H-1101 | Electrical heater |
| E-1103 | Effluent air cooler |
| P-1101 | Heat transfer fluid circulation pump |
| P-1401 A/B | Choke water pumps |
| X-1401 | Pressure letdown capillary |
| S-1501 | Gas liquid separator |

The apparatus 1 also includes valves which allow routing of media according to control by the electronic controller. These valves are as follows:

V-09, between the oxygen supply and the waste feed inlet to the economiser E-1101.

V-10, on the discharge of the choke water pumps P-1401A/B to the inlet of the second reactor stage R-1301B.

V-11, between the oxygen supply and the inlet to the second reactor stage R-1301B.

V-12, on the discharge of the choke water pumps P-1401A/B to the inlet of the third reactor stage R-1301C.

V-13, between the oxygen supply and the inlet to the third reactor stage R-1301C.

V-14, on the discharge of the choke water pumps P-1401A/B to the inlet of the economiser E-1101.

V-15, on the discharge of the choke water pumps P-1401A/B to the capillary coils X-1401.

V-16, on the HTF bypass line upstream of the electrical heater H-1101 to the air-cooled heat exchanger E-1103.

V-17, on the HTF line downstream of the electrical heater H-1101 to the economiser E-1101.

V-18, on the discharge of the HTF circulation pump P-1101 to the economiser E-1102.

V-19, on the discharge of the HTF circulation pump P-1101 to the effluent cooler E-1401.

The controller also controls the other active components such as the pumps, the heat exchangers, and the separator according to the control steps described herein.

A spent caustic feed stream, with a COD of 10,000-50,000 mg/L, is pumped from a feed tank using a high-pressure pump (P-1001). The pressure is increased to 90 Bar to 170 Bar (ideally between 145-165 Bar). Prior to adding any heat to the feed stream, excess oxygen is injected, upstream of an LT Economiser (E-1101). The oxygen injection ensures that sulphides are converted to sulphates, protecting downstream equipment and pipework against sulphidic attack. The use of a horizontal tubular reactor (R-1301) allows for an increased operating pressure, greatly increasing the oxygen solubility in the feed stream. This very significantly promotes the transfer rate of oxygen from the gas to the liquid phase, which in turn drives the liquid phase oxidation reactions to near completion. The reactor comprises three stages R-1301A, R-1301B, and R-1301C.

After the oxygen injection, the feed is preheated in the LT Economiser (E-1101) using an indirect heat transfer loop, which uses either high-pressure water or another heat transfer medium. In an example where high-pressure water is used as the heat transfer medium, the indirect loop contains water at 70 Bar to 100 Bar. The heat for preheating the LT Economiser (E-1101) is generated by cooling the reactor effluent stream in a HT Economiser (E-1102). Fine feed temperature control is achieved by means of a bypass on the water supply to the LT economizer (E-1101). An electrical heater (H-1101) provides supplementary heat if required by the system. An air cooler (E-1103) in the high temperature fluid loop cools the water post E-1101 to below 60° C. This ensures an increased temperature differential in E-1102 driving effective heat recovery from the reactor effluent stream.

Pre-heated feed is pumped to the horizontal tubular reactor (R-1301). The material of construction may be a corrosion-resistant alloy such as Alloy 600 or similar.

Several injection points along the length of the reactor allow for the addition of quench water and oxygen. The oxidation reactions are exothermic and the heat of reaction heats the process stream and a pump P-1401A/B pumps high pressure quench water to the quench water injection points along the length of the reactor, quenching the reactor temperature back to 230° C. to 250° C. before more oxygen is injected, driving the reaction to completion. The water quench and re-injection of oxygen can be repeated numerous times to attain the required COD destruction.

Hot effluent from the reactor is sent to a heat exchanger E-1102 for heat recovery. E-1102 is a double pipe heat exchanger, with the reactor effluent stream in the inner pipe and the heat transfer medium in the outer pipe. This allows for effective heat recovery to preheat the feed to the reactor. Downstream from E-1102, the process stream is cooled to between 60° C.-80° C. in an effluent cooler (E-1401). E-1401 is a double pipe heat exchanger using cooled heat transfer medium as the coolant. The heat transfer medium outlet is routed to the inlet of the air cooler (E-1103) where it is cooled before being reused in the closed recycle loop, either for heat recovery from the reactor effluent stream (E-1102) or cooling of the reactor effluent stream (E-1401). The closed heat transfer medium circulation loop eliminates the requirement for any external source of cooling. For example, no cooling water is required.

The flow scheme employs a pressure let-down step where the effluent pressure is reduced from approximately 160 Bar to atmospheric pressure. The pressure drop is achieved by the introduction of choke water from a pump P-1401A/B and subsequently passing the effluent stream through several continuous capillary coils (X-1401) with small internal dimensions. The pressure let down system ensures a gradual pressure let-down without the use of any hard restrictions (valves or orifice plates) in the process line. This vastly improves the system's pressure control and let down reliability and largely eliminates the need for maintenance on the pressure let-down step.

The effluent stream, at now reduced pressure, is sent to a gas-liquid separator (S-1501) from where the gas-free liquid effluent is either pumped or flows under gravity to neutralisation or disposal.

A portion of the treated effluent stream is automatically reintroduced into the suction line of the choke water pumps (P-1401) where it serves a dual purpose. The system utilises this treated effluent as reactor quench water and/or choke water to the pressure let down step of the process, eliminating the addition of external utility water into the process. Should the spent caustic steam contain CODs in excess of 50,000 mg/L, a portion of the treated effluent stream is automatically redirected and mixed with the spent caustic waste stream. This ensures that the feed COD is carefully controlled to not exceed 50,000 mg/L.

Sufficient nitrogen is introduced to the gas/liquid separator to ensure a constant flow of gas to the discharge. Online oxygen measurement of the percentage oxygen in the largely nitrogen rich effluent-gas stream allows for controlling the oxygen input to the reactor. The oxygen control allows for driving the oxidation reactions and the related COD destruction to full or near completion.

The treatment process allows for a COD reduction of 75 to 99.9% by weight under high pressure and high temperature conditions utilising greater than 90% oxygen by weight as the oxidising agent. The effluent stream from the hydrothermal oxidation plant has the potential to be routed to conventional wastewater treatment facilities.

Further Examples of Use

The closed heat transfer fluid (HTF) circulation loop distributes flow of HTF from the discharge of the HTF circulation pump (P-1101), to the economizer (E-1102) for heat recovery from the reactor effluent and to the process cooler (E-1401) for final effluent cooling. The flow rate of the cold (50° C.-60° C.) HTF stream routed to E-1102 for heat recovery closely matches the feed flow rate of the plant. This condition allows for maximum heat recovery from the reactor effluent stream, heating the HTF to a temperature of for example 270° C. to 285° C. Subsequently, the flow of cold HTF to E-1401 is sufficient to achieve a final treated effluent temperature of less than 70° C. The hot HTF from E-1102 is used to heat the waste feed stream in E-1101.

The amount of energy transferred to the waste feed stream is controlled by monitoring the waste feed stream temperature exiting E-1101 (for example, 240° C. to 250° C.). This temperature is controlled by adjusting the HTF flow that is routed to E-1101. The flow rate to E-1101 is controlled using the bypass control valves. In this example the bypass valves V16 and V17 are shown downstream of E-1102. In another example, the bypass valves are upstream of E-1102. Rather than bypassing the already hot stream, the flow of the stream that goes to E-1102 via valve V-18 is controlled subject to setting a minimum limit. Excess flow of cold HTF is routed via V-19 to the final effluent cooler, E-1401.

If required, supplementary heat is added to the HTF stream directed to E-1101 by means of the electrical heater (H-1101). The electrical heater (H-1101) maintains the temperature of the HTF at a temperature in the range of 270° C. and 300° C. in one example. The air-cooled heat exchanger (E-1103) removes any excess heat from the HTF, cooling it back down to 50° C. to 60° C. before it is reintroduced to the suction of the HTF circulation pump (P-1101). This ensures a high temperature gradient between the process and the HTF, thus driving heat transfer in the preferred direction.

The controller, not shown, controls the reactor by use of the three stages or sections R-1301A, B, and C in series so that they are in fact three separate reactors in sequence for optimum control of oxygen injection and temperature.

Each reactor section is fitted with an oxygen injection point at the inlet and quench water injection points are fitted between each reactor, all being controlled by the valves V-10 to V-13. Each reactor is fitted with several temperature transmitters, allowing for continuous monitoring of each reactor temperature profile.

The purpose of the inline quench water injection is to ensure that the reactor inlet temperature does not exceed 250° C. Sufficient quench water is added automatically to cool the process stream from 300° C. down to 250° C. before entering the next reactor. The addition of a quench stream between each reactor allows for treating wastes with high CODs, while maintaining reactor temperatures within 250° C.-300° C. By maintaining temperatures below 300° C., salt precipitation due to decreased solubility at higher temperatures is avoided.

The reactor quench stream is followed by injection of oxygen. The injection of oxygen ensures that exothermic oxidation reactions progress, releasing energy and subsequently heating the process stream from 250° C. to 300° C.

For oxygen and quench addition control, oxygen flow control is based on both reactor temperature and the quantity of oxygen in the off-gas stream. The reactor temperature is used as the primary control input and the quantity of oxygen in the effluent off-gas stream is used as the secondary control input. This method of control is further discussed by way of example.

Case: 1 Low COD Feed to the System:

When the apparatus 1 starts up, the oxygen flow control on the first reactor section R-1301A activates. The oxygen flow rate is increased based on the maximum temperature in that reactor section. If the reactor section temperature fails to reach the desired setpoint and the oxygen addition for the first reactor (R-1301A) has increased to 100%, then the oxygen control switches from temperature-based control to off-gas oxygen-based control. In off-gas oxygen-based control the oxygen flow rate adjusts to achieve an off-gas oxygen flow that is equivalent to 10% of the total oxygen flow injected into the system. The reactor temperature continues to be monitored. Should the temperature reach 300° C., the reactor temperature will become the control input for oxygen flow control.

Case 2: High COD Feed to the System:

If the first reactor R-1301A does reach the desired setpoint temperature (300° C.), and the off-gas oxygen concentration is low, then the oxygen flow control to the second reactor (R-1301B) will activate. Firstly, quench water is added to reduce the process stream temperature from R-1301A to 250° C. before entering the second reactor (R-1301B). Then the oxygen addition to R-1301B is enabled. R-1301B will function in the same way as R-1301A. Firstly, controlling based on the temperature in that reactor section, then either enabling control of the next reactor or switching to off-gas oxygen-based control. This control logic is repeated across as many stages as the unit is equipped with or as required.

The advantages of having multiple oxygen injection points include:

injection of sub-stoichiometric oxygen improves the temperature control within the reactor, optimization of the amount of excess oxygen required to achieve near complete destruction of COD within the waste stream, limiting the excess oxygen requirement (to for example 10% excess) realizes a saving on operation cost when compared to a much larger excess, optimized excess oxygen addition improves the heat transfer efficiency within the heat exchangers downstream of the reactor section (E-1102, E-1401), by minimizing the amount of free gas within the system, and allows for the treatment of higher COD levels than would otherwise be possible.

The reactor pressure is controlled in some examples at a pressure of 166 Bar, this condition being optimal for oxygen solubility at the reactor temperature. Regardless of system pressure, oxygen solubility decreases with increasing temperature up to about 100° C., after which, at elevated pressures (for example greater than 50 Bar), oxygen solubility increases with an increase in temperature. The increase in solubility continues as the system temperature increases, up to a point correlating with 80% to 85% of the system boiling point temperature (in ° C.). For example, a system operated at 166 Bar, has a maximum oxygen solubility at a system temperature that is equal to 0.8-0.85 times the boiling point temperature (350° C.), thus 280° C. to 298° C. A very large decrease in oxygen solubility is noted as system temperatures near the boiling point temperature.

Maintaining the reactor temperature between 250° C. and 300° C. with sequenced quench water and oxygen injection points, combined with the optimized oxygen solubility at the said reactor operating pressure, allows for effectively treating waste streams with recalcitrant COD.

The gas/liquid separator and the monitoring of the Oxygen content, and the fixed rate nitrogen flush are important for this.

The off-gas from the system 1 is mostly oxygen. The control system measures the flow rate of oxygen in the off-gas from S-1501 and varies the oxygen flow rate to the reactor based on this excess oxygen flow rate or the reactor temperature, depending on the mode. Due to the low flow rate of the off-gas, it can be difficult to read the off-gas flow rate directly without introducing some restriction/reduction in cross section in the off-gas line. Considering that there is a small potential for explosion in the gas/liquid separator, a restriction in the vent line should be avoided, thus avoiding over pressurization in the gas/liquid separation system. To avoid this restriction, the off-gas flow rate is measured by injecting a known flow rate of nitrogen and measure the oxygen concentration. From the known nitrogen flow rate and the known oxygen concentration, the oxygen flow rate is calculated.

Example: Sulphidic-Only Waste Stream Treatment

In a case where the system is used for treating spent caustic waste with COD made up substantially only of sulphidic compounds (for example sodium sulphide and/or sodium hydrosulphide) the system is preferably operated at temperatures in the range of 120° C. to 240° C. and pressures of 35 Bar to 50 Bar, yielding COD destructions of greater than 99%.

Other Waste Stream Treatment

It is envisaged that the reactor may be operated with parameters other than described above. For example, the feedstock may alternatively be spent caustic or other waste streams containing organics with oxidizable COD.

The treatment holds the following advantages and features as compared to prior approaches such as Wet Air Oxidation (WAO), mainly arising from the advantageous use of a tubular reactor as described.

Continuous processing of the waste stream to be oxidised.

Plug flow and eliminates back mixing.

Tubular reactor allows for multiple oxygen injection points, allowing for control over the COD destruction and adding flexibility for treating streams with varying inlet CODs.

Multiple injection points for quench water, ensuring effective control of the energy released from the exothermic oxidation reactions.

Increased system pressure, increasing the oxygen transfer rate which is the rate limiting factor in the oxidation reaction.

Harnessing the energy released from the exothermic reactions to effectively heat the bulk process stream.

High operating temperature ensuring very fast and complete oxidation reactions.

Plant being built as skids.

Small working volume (approximately 12% of traditional WAO)

Small operating volume offers improved safety when compared to standard WOA.

Eliminates the requirement for a statutory pressure vessel and all the required maintenance activities that goes with operation of a statutory pressure vessel.

Significantly quicker shutdown

The use of oxygen:

reduces size of compressors when compared to WAO, improves heat exchanger performance due to the absence of inert nitrogen gas in the effluent stream used for heat recovery, and eliminates almost all exhaust gas post process.

The use of multiple treated effluent recycle streams for feed dilution, quench and choke water requirements:

improves capability to treat feed streams with high and/or variable CODs improves turndown ratio of the process, and eliminates the requirement for service water during steady state operation.

Also, the heat transfer medium circulation loop efficiently transfers heat from post-reaction effluent to pre-reaction feed. The use of an electric heater and circuit containing either high-pressure water or another heat transfer medium eliminates the requirement for steam heating, ensuring maximum heat recovery and reuse. This allows for both heat recovery and effluent stream cooling to eliminates the requirement for external cooling water requirement.

Multiple water quench steps along the reactor, followed by subsequent oxygen injection points allow for effectively controlling the destruction of COD in the feed. Use of choke water ensures safe and reliable pressure control. Also, use of capillary coils in the pressure let-down system eliminates requirement for pressure control valves, increases reliability and decreases the maintenance requirement. Also, use of an air cooler eliminates requirement for cooling water.

It will be appreciated that the high operating pressure allows for achieving superior oxygen transfer rates from the gas phase into the liquid phase. The high-pressure operation in combination with a tubular reactor under plug flow conditions, ensures that energy released from the exothermic oxidation reactions is harnessed by increasing the bulk temperature of the process stream. The tubular reactor eliminates back-mixing and the increased temperature in turn accelerates the oxidation reactions, ensuring complete conversion of oxidisable components (for example sodium sulphide) to water soluble salts (for example sodium sulphate).

The prior wet air oxidation approach only partially oxidises oxidisable components, and can form problematic reaction intermediates such as sodium thiosulphate. On the other hand, in the present invention, the use of a tubular reactor at high pressures and high temperatures ensures that reaction intermediates are fully converted into harmless, water-soluble salts ($Na_2SO_4$).

The following table summarises the features and benefits of the invention

| Features | Benefits |
| --- | --- |
| Tubular reactor | Perfect plug flow and eliminates back mixing |
| | Small working volume |
| | Eliminates the requirement for a statutory pressure vessel inspection |
| | Maximizes heat recovery |
| Small operating volume | Improved safety |
| Multiple quench and oxygen injection points along the reactor | Control over the COD destruction and adding flexibility for treating streams with varying inlet CODs |
| | Effective control of the energy released from the rapid exothermic oxidation reactions |
| High pressure operation capability | Increased oxygen transfer rate which is the rate limiting factor in the oxidation reaction |
| High temperature operation capability | Very fast and complete oxidation reactions |
| Plant is supplied as modular skids | Fast site assembly |
| | Factory tested |
| | Can be relocated |
| Use of oxygen as the oxidant | Significantly reduces size of compressors |
| | Greatly improves heat exchanger performance |
| | Eliminates almost all exhaust gas post process |
| Minor quantities of off-gas generated | No requirement for additional off-gas treatment |
| Electric heater | Eliminates the requirement for steam heating |
| Use of capillary coils in the pressure let down system | Eliminates the requirement for pressure control valves, increases reliability and decreases the maintenance requirement |
| Use of treated effluent for feed dilution | Increased flexibility in terms of feed COD |
| | Improved process turn-down ratios |
| Use of treated effluent for internal process water requirements (Quench and Choke water) | Eliminates the requirement for continuous addition of service water |
| | Ensures that the volume of treated waste does not increase compared to volume of waste feed. |
| Use of an air-cooled heat exchanger | Eliminates requirement for cooling water |
| Fully automated | Limited operator input |
| Remote access and monitoring | Over-the-air updates and diagnostics |

The invention is not limited to the embodiments described but may be varied in construction and detail.

The invention claimed is:

1. A treatment process for treatment of a feed stream with oxidizable COD, wherein the process comprises:
   a. feeding the feed stream through a tubular reactor with exothermic oxidation reactions at line velocities and sufficient salt dilution to avoid precipitation, in which a plurality of injection points inject inline oxygen and quench water to control exothermic oxidation reactions in the reactor, wherein:
   retention time in the reactor is in the range of 8 mins to 30 mins,
   a pump pumps quench water to the quench water injection points along the length of the reactor, quenching the reactor temperature before more oxygen is injected, driving the reactions to completion,
   reactor heating is performed by one or more heat exchangers having a tube-in-tube configuration, the outer tube carrying a pressurized heat transfer medium, temperature in the reactor is in the range of 220° C. to 360° C.,
   pressure in the reactor is in the range of 90 Bar to 170 Bar,
   b. performing heat recovery from a reactor effluent stream, and
   c. a gas/liquid separator separating the effluent stream to provide a gas safe for discharge and a treated liquid effluent stream.

2. The treatment process as claimed in claim 1, wherein the waste stream includes spent caustic.

3. The treatment process as claimed in claim 1, wherein the waste stream includes spent caustic, and wherein the spent caustic (SC) is either a refinery or a sulphidic spent caustic stream containing oxidizable COD.

4. The treatment process as claimed in claim 1, wherein the waste stream includes spent caustic, and wherein the spent caustic (SC) is either a refinery or a sulphidic spent caustic stream containing oxidizable COD, and wherein a closed heat transfer medium circulation loop performs heat recovery from the reactor effluent stream to the spent caustic feed stream.

5. The treatment process as claimed in claim 1, wherein prior to adding heat to the stream, excess oxygen is injected upstream of an economiser which feeds the reactor, whereby sulphides are converted to sulphates to protect downstream equipment and pipework against sulphidic attack.

6. The treatment process as claimed in claim 1, wherein prior to adding heat to the stream, excess oxygen is injected upstream of an economiser which feeds the reactor, whereby sulphides are converted to sulphates to protect downstream equipment and pipework against sulphidic attack; and wherein, after the oxygen injection, the feed is preheated in an economiser using an indirect heat transfer loop, which uses a heat transfer medium; and wherein heat for preheating the economiser is provided by cooling the reactor effluent stream; and wherein an air cooler cools the heat transfer medium after transfer of heat to the feed stream to below 60° C.

7. The treatment process as claimed in claim 1, comprising the further steps of recycling treated liquid effluent back to the reactor to control the waste feed COD, and reusing treated liquid effluent to eliminate requirement for service water make-up during steady state processing.

8. The treatment process as claimed in claim 1, wherein the temperature in the reactor is in the range of 220° C. to 320° C.

9. The treatment process as claimed in claim 1, wherein the pressure in the reactor is in the range of 145 Bar to 165 Bar.

10. The treatment process as claimed in claim 1, wherein the feed stream comprises sulphidic compounds contributing to COD, and wherein said sulphidic compounds comprise sodium sulphide and/or sodium hydrosulphide.

11. The treatment process as claimed in claim 1, wherein injection of quench water is performed to reduce process temperature in the reactor to a value in the range of 230° C. to 250° C. prior to injection of additional oxidant, and allows for treatment of waste feed with larger COD loading.

12. The treatment process as claimed in claim 1, wherein treated effluent from the process is reused as quench water feed to the reactor.

13. The treatment process as claimed in claim 1, wherein the effluent stream is cooled to between 60° C. and 80° C. in an effluent cooler, in which a heat transfer medium is routed to an inlet of an air cooler where it is cooled before being reused in a closed heat transfer medium circulation loop for the reactor, either for heat recovery from the reactor effluent stream or cooling of the reactor effluent stream.

14. The treatment process as claimed in claim 1, wherein a pressure let-down step is performed by introduction of recycled treated effluent to pressure let down capillary coils.

15. The treatment process as claimed in claim 1, wherein a pressure let-down step is performed by introduction of recycled treated effluent to pressure let down capillary coils; and wherein the effluent pressure is reduced by introduction of recycled treated effluent as choke water from a pump and subsequently passing the effluent stream through the capillary coils; and wherein the effluent stream, at reduced pressure, is sent to a gas-liquid separator from which a gas-free liquid effluent is either pumped or flows under gravity to neutralisation or disposal.

16. The treatment process as claimed in claim 1, wherein treated effluent is recycled and mixed with the feed stream in a ratio that allows control of the waste feed COD; and wherein nitrogen is introduced to the gas/liquid separator to ensure a constant flow of gas to the discharge.

17. The treatment process as claimed in claim 1, wherein the waste stream comprises refinery or sulphidic spent caustic streams with CODs of up to 50,000 mg/L without dilution.

18. The treatment process as claimed in claim 1, wherein the waste stream comprises spent caustic streams with CODs in excess of 50,000 mg/L by initially, before feeding to the reactor, recycling treated effluent to dilute the feed stream down to 50,000 mg/L.

* * * * *